US012698098B2

(12) United States Patent
Sweers et al.

(10) Patent No.: US 12,698,098 B2
(45) Date of Patent: Aug. 4, 2026

(54) SYSTEMS AND METHODS FOR INSPECTING AIRCRAFT

(71) Applicant: THE BOEING COMPANY, Arlington, VA (US)

(72) Inventors: Gregory James Sweers, Renton, WA (US); Walter Joseph Jarecki, Chino Hills, CA (US)

(73) Assignee: The Boeing Company, Arlington, VA (US)

( * ) Notice: Subject to any disclaimer, the term of this patent is extended or adjusted under 35 U.S.C. 154(b) by 91 days.

(21) Appl. No.: 18/536,453

(22) Filed: Dec. 12, 2023

(65) Prior Publication Data

US 2024/0383616 A1     Nov. 21, 2024

Related U.S. Application Data

(60) Provisional application No. 63/502,929, filed on May 18, 2023.

(51) Int. Cl.
 B64F 5/60          (2017.01)
(52) U.S. Cl.
 CPC ..................................... B64F 5/60 (2017.01)
(58) Field of Classification Search
 CPC ...... B64F 5/60; G01N 21/88; G01N 21/8803; G01N 21/9515; B64U 2101/26; G06T 7/001
 See application file for complete search history.

(56) References Cited

U.S. PATENT DOCUMENTS

| | | | | |
|---|---|---|---|---|
| 8,983,794 B1 * | 3/2015 | Motzer | .................. | G01B 21/04 |
| | | | | 702/155 |
| 9,646,431 B2 * | 5/2017 | Schwartz | ............. | G07C 5/0808 |
| 9,747,564 B1 * | 8/2017 | Shi | ..................... | G06Q 10/0631 |
| 11,568,783 B1 * | 1/2023 | Sahlsten | ............. | G09G 3/2092 |
| 2004/0183900 A1 * | 9/2004 | Karpen | ................. | G06T 7/0008 |
| | | | | 348/86 |

(Continued)

FOREIGN PATENT DOCUMENTS

| | | | | |
|---|---|---|---|---|
| CN | 109587195 A | * | 4/2019 | ............. H04N 7/185 |
| CN | 113744230 | | 12/2021 | |

(Continued)

OTHER PUBLICATIONS

English translation CN 113744230A (Year: 2021).*
Extended European Search Report for EP 24170375.0-1004, dated Oct. 14, 2024.

*Primary Examiner* — Fernando Alcon
(74) *Attorney, Agent, or Firm* — Joseph M. Butscher; Carroll, Hoette & Butscher, LLC

(57) ABSTRACT

A system for inspecting an aircraft at a first location, includes an imaging device configured to acquire one or more images of one of or more surfaces of the aircraft at the first location. A control unit is in communication with the imaging device. The control unit is configured to receive the one or more images. A user interface is in communication with the control unit. The user interface is at a second location that differs from the first location. The user interface includes a display. The control unit is configured to show the one or more images on the display. As such, the inspection is performed at the first location, such as by an individual using the display.

21 Claims, 10 Drawing Sheets

Human Eye Resolution Mega Pixels (MP)

4x6

2x2

Length: 72" /0.0089" =8089 pixels
Width: 48" /0.0089" = 5393 pixels

(56)                References Cited

U.S. PATENT DOCUMENTS

| 2010/0063650 | A1* | 3/2010 | Vian | B64F 5/60 |
| | | | | 701/2 |
| 2014/0198984 | A1* | 7/2014 | Chen | G06T 7/001 |
| | | | | 382/167 |
| 2015/0312560 | A1* | 10/2015 | Deering | G02B 27/0172 |
| | | | | 345/1.3 |
| 2016/0114907 | A1 | 4/2016 | Schwartz | |
| 2016/0264262 | A1* | 9/2016 | Colin | B25J 19/023 |
| 2017/0248967 | A1* | 8/2017 | Krogh | B64U 10/13 |
| 2017/0291723 | A1* | 10/2017 | Reddy | G01S 19/13 |
| 2018/0346150 | A1* | 12/2018 | Remond | G02B 23/24 |
| 2019/0077509 | A1* | 3/2019 | Hsu | G05D 1/0022 |
| 2019/0145902 | A1* | 5/2019 | Tan | H04L 67/12 |
| | | | | 702/35 |
| 2019/0185186 | A1* | 6/2019 | Li | G06V 10/32 |
| 2019/0236732 | A1* | 8/2019 | Speasl | G05D 1/101 |
| 2020/0096328 | A1* | 3/2020 | Raab | G01B 11/2522 |
| 2020/0207488 | A1* | 7/2020 | Troy | G05D 1/222 |
| 2020/0324919 | A1* | 10/2020 | Drayton | G01N 21/954 |
| 2020/0363822 | A1* | 11/2020 | Georgeson | G01M 5/0016 |
| 2020/0377233 | A1* | 12/2020 | Harvey | G01N 21/9515 |
| 2021/0206515 | A1* | 7/2021 | Stefanowski | G01M 5/0016 |
| 2021/0304390 | A1 | 9/2021 | Lowry | |
| 2022/0012462 | A1* | 1/2022 | Shemesh | G06T 11/203 |
| 2022/0134903 | A1* | 5/2022 | Nubbe | B64C 39/04 |
| | | | | 320/134 |
| 2022/0188670 | A1* | 6/2022 | Sweers | B64F 5/60 |
| 2022/0309644 | A1 | 9/2022 | Shi | |
| 2023/0126817 | A1* | 4/2023 | Goyal | H04N 7/188 |
| | | | | 348/143 |

FOREIGN PATENT DOCUMENTS

| CZ | 29268 U1 | 3/2016 |
| WO | WO 2023/159323 | 8/2023 |

* cited by examiner

Human Eye Resultant Object Size

Aircraft

S = Arc Length = 0.0089 inches

D = Distance to aircraft = 30.5 inches

Human
Eye

Θ = One minute of arc
= 0.000290888 radians

S = D x Θ
0.0089 = 30.5 x 0.000290888

Resultant object size or
space/gap between two
edges of a spatial pattern one minute of arc length
= 0.0089 inches Letter 'E' on 20/20 eye chart 5 minutes of arc Observing Distance from Monitor

110

$\Theta$ = One minute of arc = 0.000290888 radians d = Observing Distance from Monitor
$\Theta$ = One minute of arc = 0.000290888 radians
S = Arc length = Pixel size S = d * $\Theta$
d = S/$\Theta$

S

S

Area of one pixel = $S^2$

105

105

SYSTEMS AND METHODS FOR INSPECTING AIRCRAFT

CROSS-REFERENCE TO RELATED APPLICATIONS

This application relates to and claims priority benefits from U.S. Provisional Patent Application No. 63/502,929, filed May 18, 2023, which is hereby incorporated by reference in its entirety.

FIELD OF THE DISCLOSURE

Examples of the present disclosure generally relate to systems and methods for remotely inspecting aircraft.

BACKGROUND OF THE DISCLOSURE

Aircraft are used to transport passengers and cargo between various locations. Numerous aircraft depart from and arrive at a typical airport every day.

Aircraft are manually inspected before and after flights. For example, an individual views various portions of an aircraft for evidence of damage, such as caused by other objects, hail, lightning, and/or the like. Manual inspections generally require use of lifts, which risk potential falls, and can potentially cause damage to the aircraft, such as through accidental lift contact. Further, the process of such inspections is time and labor intensive. For example, one or more individuals operate the lift, as well as adroitly maneuver support equipment to access various areas of an aircraft. Also, manual documentation of inspection results typically produces non-digital information that may not be readily accessible.

SUMMARY OF THE DISCLOSURE

A need exists for an improved system and method for inspecting aircraft. With that need in mind, certain examples of the present disclosure provide a system configured for an inspection of an aircraft at a first location. The system includes an imaging device configured to acquire one or more images of one of or more surfaces of the aircraft at the first location. A control unit is in communication with the imaging device. The control unit is configured to receive the one or more images. A user interface is in communication with the control unit. The user interface is at a second location that differs from the first location. The user interface includes a display. The control unit is configured to show the one or more images on the display. The inspection is performed at the second location.

The inspection can include one or more of a general visual inspection of the aircraft, a lightning strike inspection of the aircraft, or a hail damage inspection of the aircraft.

In at least one example, the control unit is configured to modify the one or more images based on at least one characteristic of the display.

In at least one example, the control unit is configured to calculate optical requirements of the display to preserve an optical resolution that matches human eye inspection performance of the aircraft.

In at least one example, the control unit is configured to model human vision performance by applying calculations of human eye resolving power to establish a baseline for replicating capabilities on the display.

In at least one example, the control unit is configured to partition the one or more images into parts shown on the display.

The control unit can be further configured to store the one or more images in a memory.

In at least one example, a mobile cart includes the imaging device. As another example, a drone includes the imaging device.

In at least one example, the control unit is configured to compare the one or more images with one or more reference images of the aircraft to automatically detect one or more anomalies.

In at least one example, the control unit is configured to automatically determine one or more anomalies in the one or more images through artificial intelligence or machine learning.

Certain examples of the present disclosure provide a method for an inspection of an aircraft at a first location. The method includes acquiring, by an imaging device, one or more images of one of or more surfaces of the aircraft at the first location; receiving, by a control unit in communication with the imaging device, the one or more images; showing, by the control unit, the one or more images on a display of a user interface at a second location that differs from the first location; and performing, by said showing, the inspection of the aircraft at the second location.

Certain examples of the present disclosure provide a non-transitory computer-readable storage medium comprising executable instructions that, in response to execution, cause one or more control units comprising a processor, to perform operations including receiving one or more images of one or portions of an aircraft at a first location from an imaging device; and showing the one or more images on a display of a user interface at a second location that differs from the first location to allow performance of the inspection at the second location.

DETAILED DESCRIPTION OF THE DISCLOSURE

Figure 1:
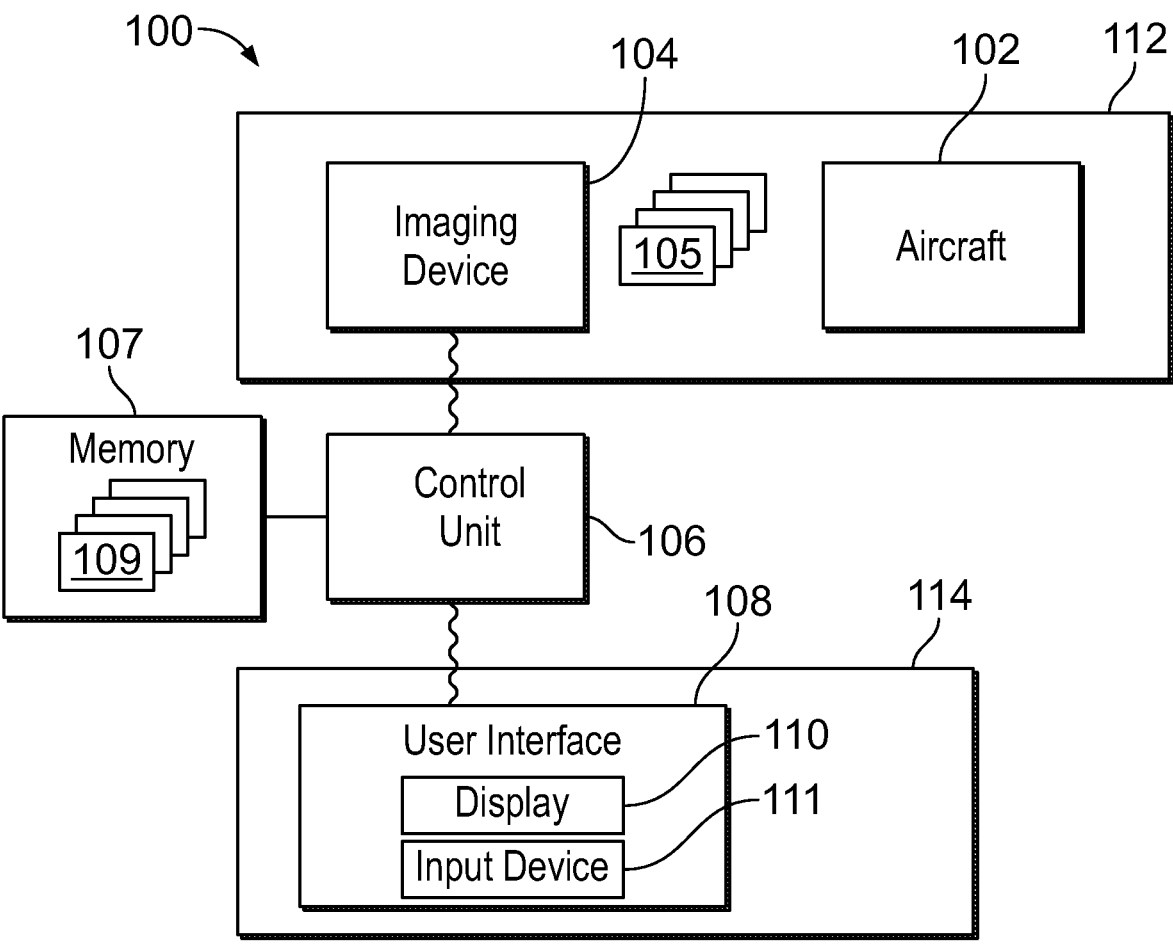
FIG. 1 illustrates a schematic block diagram of a system for inspecting an aircraft, according to an example of the present disclosure.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide systems and methods for remotely inspecting aircraft. The systems and methods may be used with various types of aircraft inspections, such as general visual inspections, lightning strike inspections, hail damage inspections, and/or the like. The systems and methods provide remote inspections that reduce overall inspection time, reduce the potential of injury to individuals, as well as reduce the potential of damage to an aircraft.

The systems and methods provide image-based, remote inspections. The images may be stored for future reference, and can be used to track potential damage over time, as well as provide permanent digital records of aircraft condition.

In at least one example, the systems and methods are configured to determine and translate human eye capabilities to digital information to be viewed at a remote work station. Image capture parameters and monitor technical specifications can be used in a process that replicates the experience at the aircraft while positioned in a remote location. Transfer of image information can be processed through a cloud system by inspectors anywhere in the world.

Examples of the present disclosure provide an equivalent inspection experience that satisfies certified aircraft maintenance requirements. The systems and methods can be configured to determine damage type, such as through stored reference images, artificial intelligence, and/or machine learning.

In at least one example, a control unit performs an image processing algorithm, which can also provide image overlap percentage, inspection image progression, depth and size evaluation, and the like. In at least one example, the control unit is configured to model human vision performance, such as by applying calculations of the human eye resolving power that establishes a baseline for replicating capabilities at a remote work site. Remote site hardware and system specifications for monitor capabilities are used in processing logic by the control unit. The results of the modeling create an image partition scheme that utilize the capabilities of a monitor and the input of the aircraft image associated with the human eye model at the work site.

Examples of the present disclosure provide systems and methods for inspecting an aircraft. The systems and methods include an imaging device configured to acquire one or more images of one of or more surfaces of the aircraft. A control unit is in communication with the imaging device. The control unit is configured to receive the one or more images. A user interface is in communication with the control unit. The user interface includes a display. The control unit is configured to show the one or more images (such as processed image(s)) on the display. In at least one example, the imaging device is at a location of the aircraft, and the user interface is remote from the location of the aircraft. In at least one example, the control unit is configured to modify the one or more images based on at least one characteristic of the display.

FIG. 1 illustrates a schematic block diagram of a system 100 for inspecting an aircraft 102, according to an example of the present disclosure. The system 100 can be used in relation to various types of inspection, such as general visual inspection, lightning strike inspection, hail damage inspection, and/or the like. The system 100 can be used during maintenance operations, as well as a manufacturing process. The system 100 includes an imaging device 104, such as a camera. The camera can be a digital photographic camera. As another example, the imaging device 104 can be a video camera. As another example, the imaging device 104 can be an infrared camera.

The imaging device 104 is configured to acquire images 105 of various portions of the aircraft 102. In at least one example, the imaging device 104 is configured to acquire digital photographs of various exterior surfaces of the aircraft 102. As another example, the imaging device 104 can be configured to acquire digital video of the various surfaces of the aircraft 102.

In at least one example, the imaging device 104 can be supported on a mobile platform that is configured to maneuver the imaging device 104 around the aircraft. As an example, the imaging device 104 can be coupled to a mobile cart, such as by one or more moving arms, booms, or the like. As another example, the imaging device 104 can be coupled to a drone, which is configured to be flown around the aircraft. The imaging device 104 can be moved in accordance with a defined path (for example, flight plan defined by an original equipment manufacturer (OEM) or airline associated with the aircraft) to ensure that the inspection is completed in a manner such that certification or other requirements are met.

The imaging device 104 and the aircraft 102 are at a first location 112. That is, the imaging device 104 is at the location of the aircraft 102. The imaging device 104 is located proximate to (such as within a viewing range of the imaging device 104) the aircraft 102 to allow the imaging device 104 to acquire the images 105 of various exterior and/or interior surfaces of the aircraft 102, as described herein. In at least one example, image positioning plans for the imaging device 104 establish an image field of view, distance from an object to be imaged, a gimble angle setting, and/or other location and orientation requirements.

A control unit 106 is in communication with the imaging device 104, such as through one or more wired or wireless connections. The control unit 106 can be remotely located from the imaging device 104. The control unit 106 is configured to receive the acquired images from the imaging device 104.

The control unit 106 is also in communication with a user interface 108, such as through one or more wired or wireless connections. The user interface 108 includes a display 110, such as an electronic monitor, television, or the like. In at least one example, the control unit 106 and the user interface 108 are part of a computer workstation. In at least one other example, the control unit 106 and the user interface 108 can be part of a handheld device. The user interface 108 also includes an input device 111, such as one or more of a keyboard, a mouse, a stylus, a touchscreen interface, and/or the like. The input device 111 allows a user to retrieve images and data, select and manipulate the images and data, and/or the like.

The user interface 108 is at a second location 114 that is separate and distinct from the first location 112. The first location 112 may not be viewable from the second location 114. As an example, the first location 112 outside of a gate of an airport, while the second location 114 can be a closed room in which the first location 112 cannot be viewed. As another example, the first location 112 and the second location 114 can be separated by large distances, such as tens, hundred, or thousands of miles apart. The user interface 108 is remotely located from the imaging device 104 and the aircraft 102. That is, the user interface 108 is not at the first location 112, such as the location of the aircraft. Instead, the user interface 108 can be at a central monitoring location, which is remote from the aircraft.

The control unit 106 can be at the first location 112. For example, the imaging device 104 can include the control unit 106. As another example, the control unit 106 can be at the second location 114. As another example, the control unit 106 can be at a third location that differs from the first location 112 and the second location 114.

In at least one example, the control unit 106 is also in communication with a memory 107, such as through one or more wired or wireless connections. The control unit 106 can include the memory 107. The memory 107 stores one or more reference images 109 of portions of the aircraft 102.

In at least one example, the control unit 106 can also store the images 105 acquired by the imaging device 104, such as within the memory 107. In this manner, the acquired images 105 can be used as additional reference images 109 for future inspections. The stored images 105 can be used to track potential damage over time, as well as provide permanent digital records of a condition of the aircraft 102.

In operation, the imaging device 104 acquires the images 105 of various surfaces of the aircraft. 102 The control unit 106 receives the images 105, which are then shown on the display 110. As such, the inspection of the aircraft 102 is performed at the second location 114, remotely from the first location 112, such as by an individual viewing the images 105 on the display 110.

The control unit 106 is configured to show the images 105 on the display 110 at the second location 114. The images 105 shown in the display 110 at the second location 114 are shown on the display to match human eye capability at the first location 112.

In at least one example, the control unit 106 automatically performs the inspection without human intervention. For example, the control unit 106 compares the images 105 with the reference images 109 to automatically determine anomalies (for example, differences) therebetween. The control unit 106 then flags the anomalies on the images 105, and outputs an alert to the user interface 108 indicating the anomalies. The alert can include one or more of a graphic, text, audio, and/or the like. For example, the control unit 106 can automatically highlight, enclose, circle, indicate through an arrow, and/or the like anomalies within the images 105.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 106 may be or include one or more processors that are configured to control operation, as described herein.

The control unit 106 is configured to execute a set of instructions that are stored in one or more data storage units or elements (such as one or more memories), in order to process data. For example, the control unit 106 may include or be coupled to one or more memories. The data storage units may also store data or other information as desired or needed. The data storage units may be in the form of an information source or a physical memory element within a processing machine.

The set of instructions may include various commands that instruct the control unit 106 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 106. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 106 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and nonvolatile RAM (NVRAM) memory. The above data storage unit types are exemplary only, and are thus not limiting as to the types of memory usable for storage of a computer program.

The system 100 is configured to provide a remote, non-instrumented inspection in relation to an exterior and/or interior of the aircraft 102. The remote inspection is configured to be equivalent to aircraft maintenance performed by a licensed mechanic/inspector at the aircraft inspection location. Using a typical human vision rating standard such as 20/20 vision for completing the inspection by a human at the inspection location, examples of the present disclosure use the images 105 and specified monitor capability at a location (such as the second location 114) that is remote from the aircraft 102. The control unit 106 provides the images 105 of the aircraft 102, acquired by the imaging device 104 at the first location 112, to the display 110 at the second location 114. For example, the control unit 106 shows the images 105 on the display 110.

In at least one example, the control unit 106 calculates optical requirements (for example, monitor size, pixel density, distance from monitor, and the like) of the display 110 to preserve an optical resolution needed to match human eye inspection performance. Examples of the present disclosure ensure equivalent results between the inspection performed remotely and at the inspection location. In general, the systems and methods described herein allow for remote visual inspection of images of surfaces of the aircraft 102.

It has been found that the remote inspection systems and methods described herein substantially reduce inspection time (such as by at least 50%). The systems and methods also (a) allow for flexible maintenance planning activity that identifies surface anomalies early in the process, (b) reduce airline costs, and (c) increase safety (for example, the individual does not need to move on and around the aircraft 102).

Known aircraft inspection processes are governed by regulation and approved practices. An aircraft manufacturer mandates approved maintenance practices to ensure continued safe operation. In order to perform a remote inspection that is equivalent to current practices having a mechanic positioned at the aircraft, the systems and methods described herein ensure equivalent outcomes to the inspection performed at the site. Remote aircraft inspections utilize unique processes and tools for large area inspections, and eliminate or otherwise reduce the need for access infrastructure such as lifts and stanchions, thereby reducing exposure to potential safety events. As described herein, the systems and methods analyze the following: 1) human eye acuity, 2) distance from aircraft, 3) human eye resolution, and 4) monitor characteristics.

Figure 2:
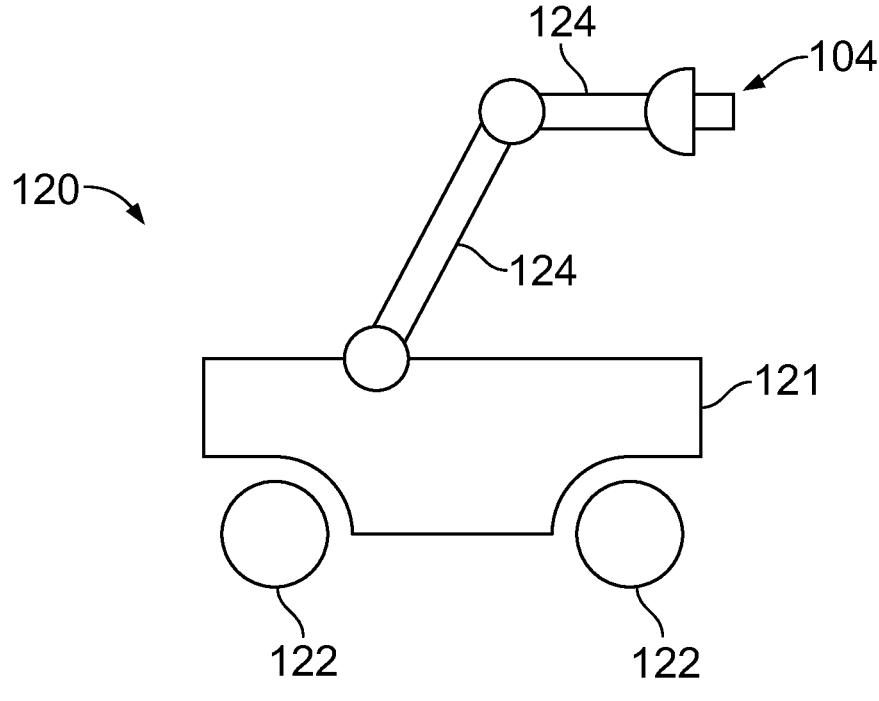
FIG. 2 illustrates a simplified diagram of a mobile platform having an imaging device, according to an example of the present disclosure.

FIG. 2 illustrates a simplified diagram of a mobile platform 120 having the imaging device 104, according to an example of the present disclosure. The imaging device 104 is supported on the mobile platform 120, such as a moveable cart configured to maneuver the imaging device 104 around an aircraft. For example, the mobile platform 120 includes a base 121 having wheels 122. One or more moveable arms 124 moveable couple the imaging device 104 to the base 121.

Figure 3:
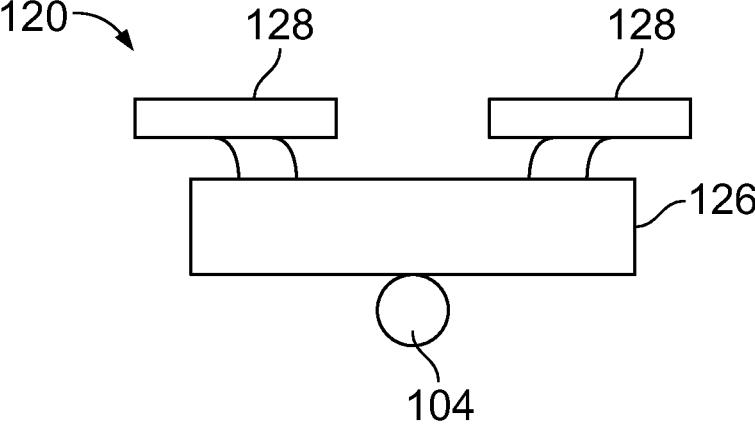
FIG. 3 illustrates a simplified diagram of a mobile platform having an imaging device, according to an example of the present disclosure.

FIG. 3 illustrates a simplified diagram of a mobile platform 120 having the imaging device 104, according to an example of the present disclosure. The mobile platform 120 can be or otherwise include a drone having an airframe 126 and a propulsion system 128, such as one or more propellers. The drone is configured to be flown around an aircraft.

Figure 4:
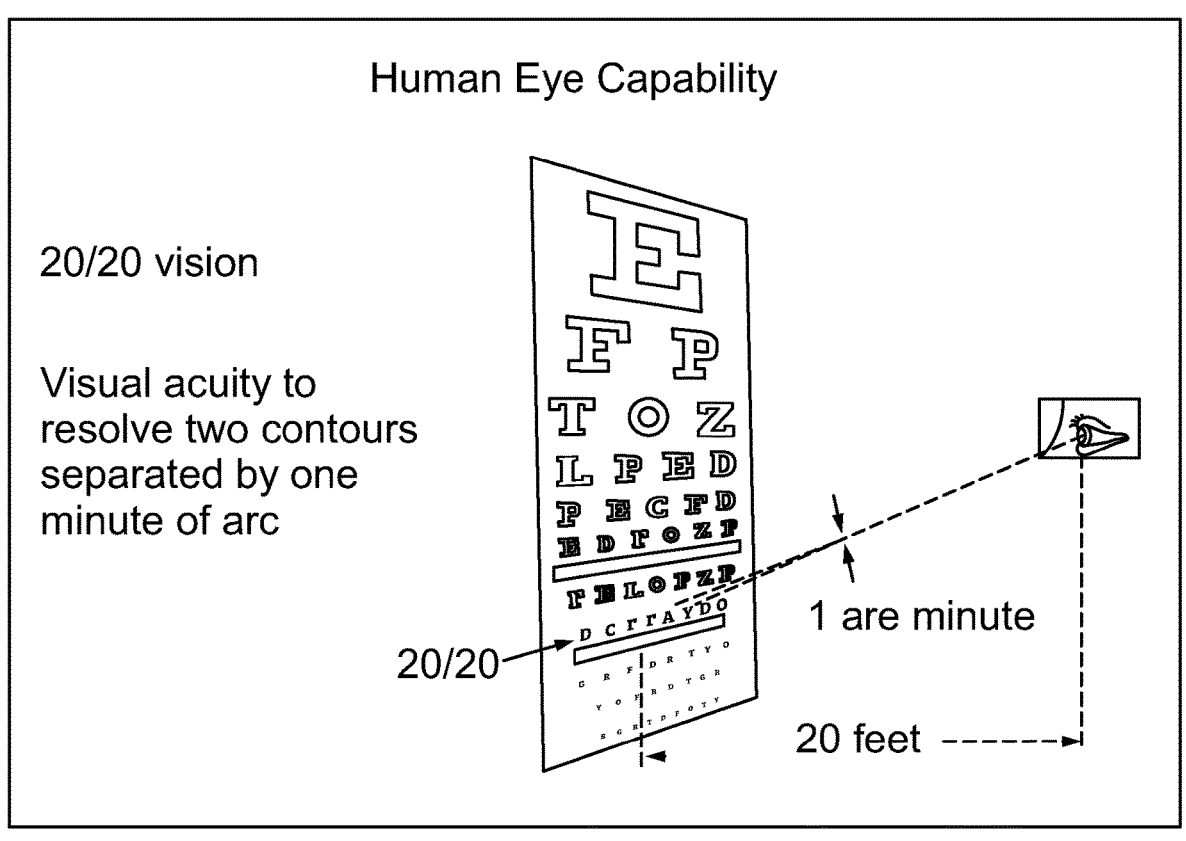
FIG. 4 illustrates a simplified description of human eye capability.

FIG. 4 illustrates a simplified description of human eye capability.

Referring to FIGS. 1-4, in at least one example, the control unit 106 can first establish the human eye's capability in order to replicate the human eye examination of the aircraft 102 using a remote computer station, such as the user interface 108. The human eye is capable of clearly seeing objects of a particular size from a specified distance. Measurement of this ability is defined as acuity. A visual acuity test is an eye examination that measures an individual's eyes ability to read or see small details determining the sharpness and clarity of vision. In order to conduct an examination of an object such as one or more portions of the aircraft 102 at the first location 112, the capabilities of the eye determine the ability to see non-conformances on the objects surface such as scratches, gouges, cracks, and the like. Though different technicians have varied visual acuity, the control unit 106 can assume 20/20 vision, which is a typical measure of normal vision either corrected or uncorrected. 20/20 vision is defined as an individual's ability to see an object at 20 feet away resolved to 1 arc minute the same as an average individual can see on an eye chart.

Figure 5:
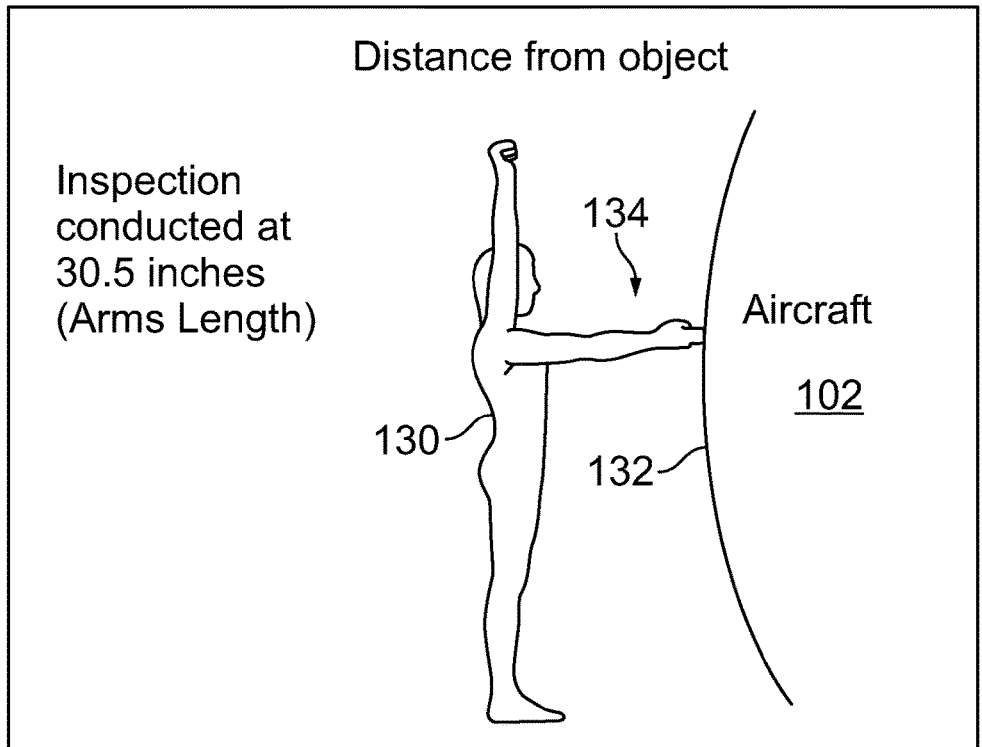
FIG. 5 illustrates a simplified view of an individual separated from a surface of an aircraft by a distance.

FIG. 5 illustrates a simplified view of an individual 130 separated from a surface 132 of the aircraft 102 by a distance 134. Aircraft inspections are typically conducted at specified distances from the aircraft 102, depending on the type of inspection being conducted. For example, a general visual inspection is defined by industry guidance to be conducted within touching distance. Referring to FIGS. 1-5, in at least one non-limiting example, the control unit 106 can use 30.5 inches as an average of typical men's and women's arms reach indicating the distance one would be from the aircraft 102 being inspected if a general visual inspection was being conducted. Optionally, the distance 134 can be less than 30.5 inches (such as 20-30 inches), or greater than 30.5 inches (such as 31-45 inches).

Figures 6, 7:
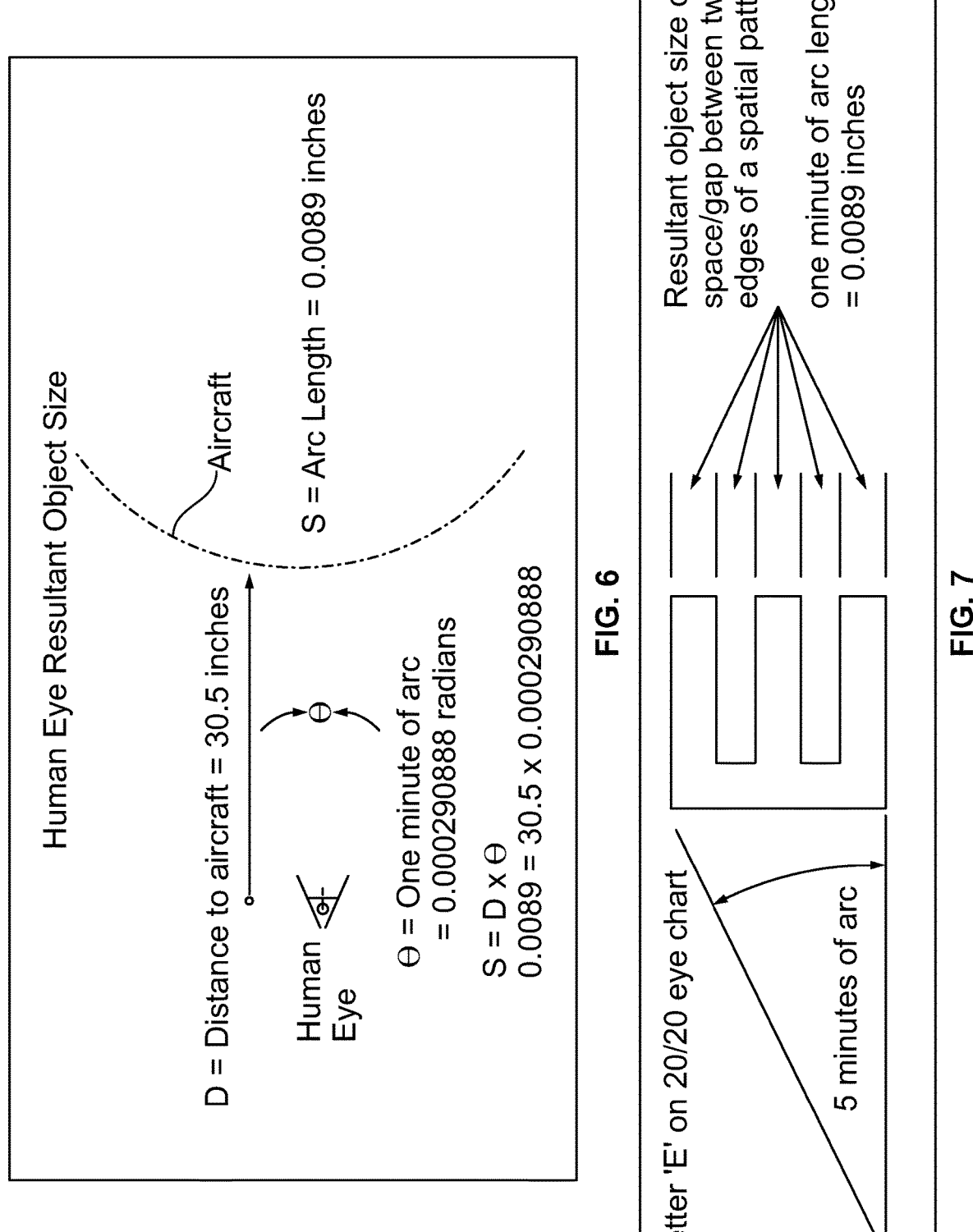
FIG. 6 illustrates a simplified description of human eye resultant object size.
FIG. 7 illustrates a letter E on an eye chart.

FIG. 6 illustrates a simplified description of human eye resultant object size. FIG. 7 illustrates a letter E on an eye chart. As shown and described with respect to FIGS. 6 and 7, the ability of a human conducting an inspection at 30.5 inches away from an object can be calculated. Referring to FIGS. 1-7, in at least one example, the control unit 106 calculates a resulting arc length(S) when Theta is 1 minute of arc and D is 30.5 inches away from the object. The resultant object size or space/gap between two edges of a spatial pattern that can be seen with 20/20 vision is 0.0089 inches, which represents the size of the object that can be resolved by the human eye.

Figure 8:
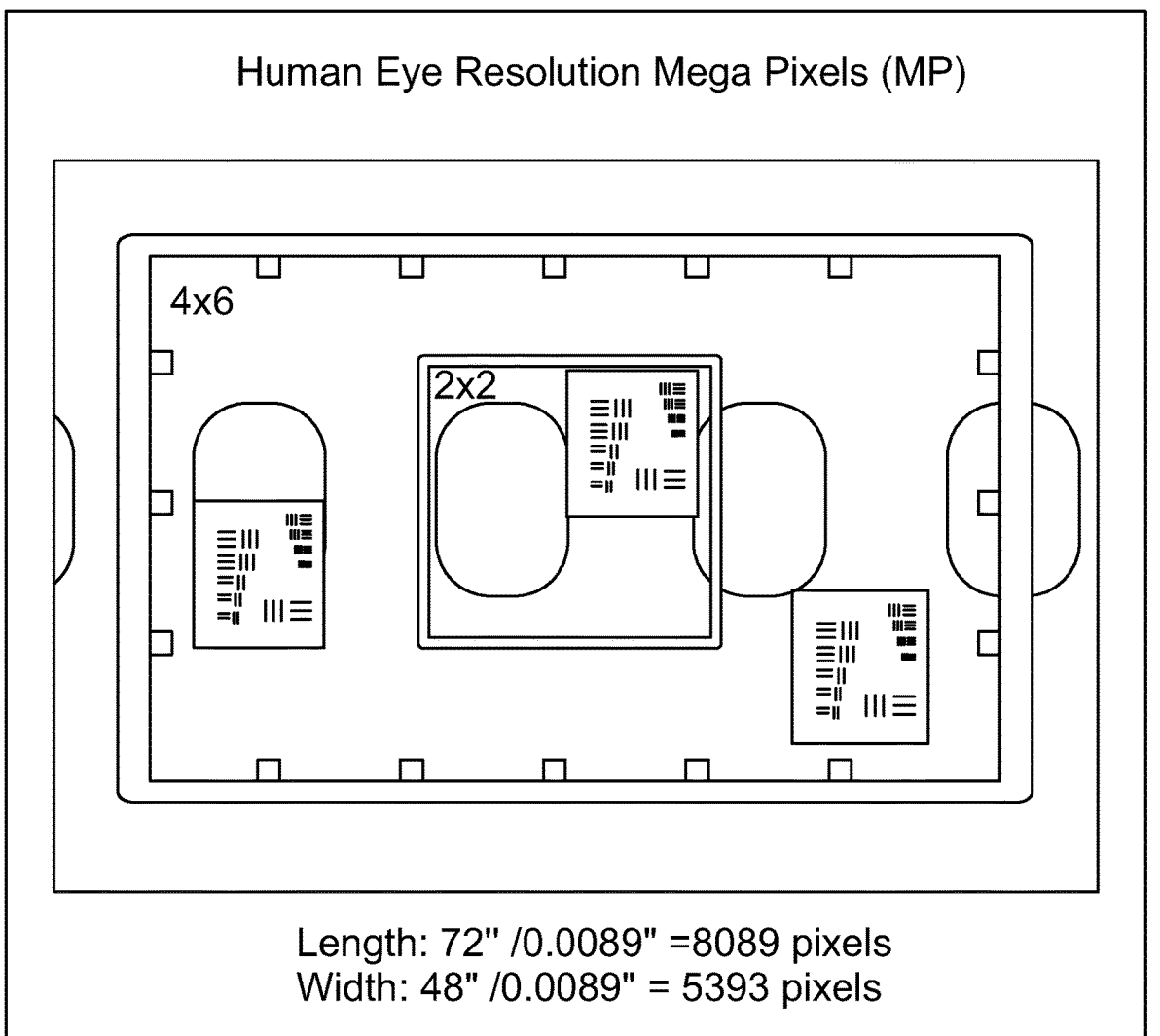
FIG. 8 illustrates a simplified description of human eye resolution in mega-pixels.

FIG. 8 illustrates a simplified description of human eye resolution in mega-pixels. As shown and described in FIG. 8, the area an individual is capable of observing when standing within arms' reach from the aircraft is 48 inches up:down and 72 inches left:right, which is referred to as a Field of View (FOV). In this case, the FOV is case is defined to be a 6 foot by 4 foot rectangle defining the bounds of the individual's capability to see in all directions from an inspection location. As described, the size of the resultant object size that can be resolved by the human eye at 30.5 inches from the object is 0.0089 inches. Referring to FIGS. 1-8, to find the human eye resolution to cover a 6 foot×4 foot area the control unit 106 divides the resultant object size (0.0089") by the 6 foot×4 foot FOV, thereby giving the number of pixels that would fit in the 6 foot×4 foot space. This calculation results in 8089 pixels×5393 pixels for a total of 43,623,977 pixels or about 44 mega-pixels.

Figure 9:
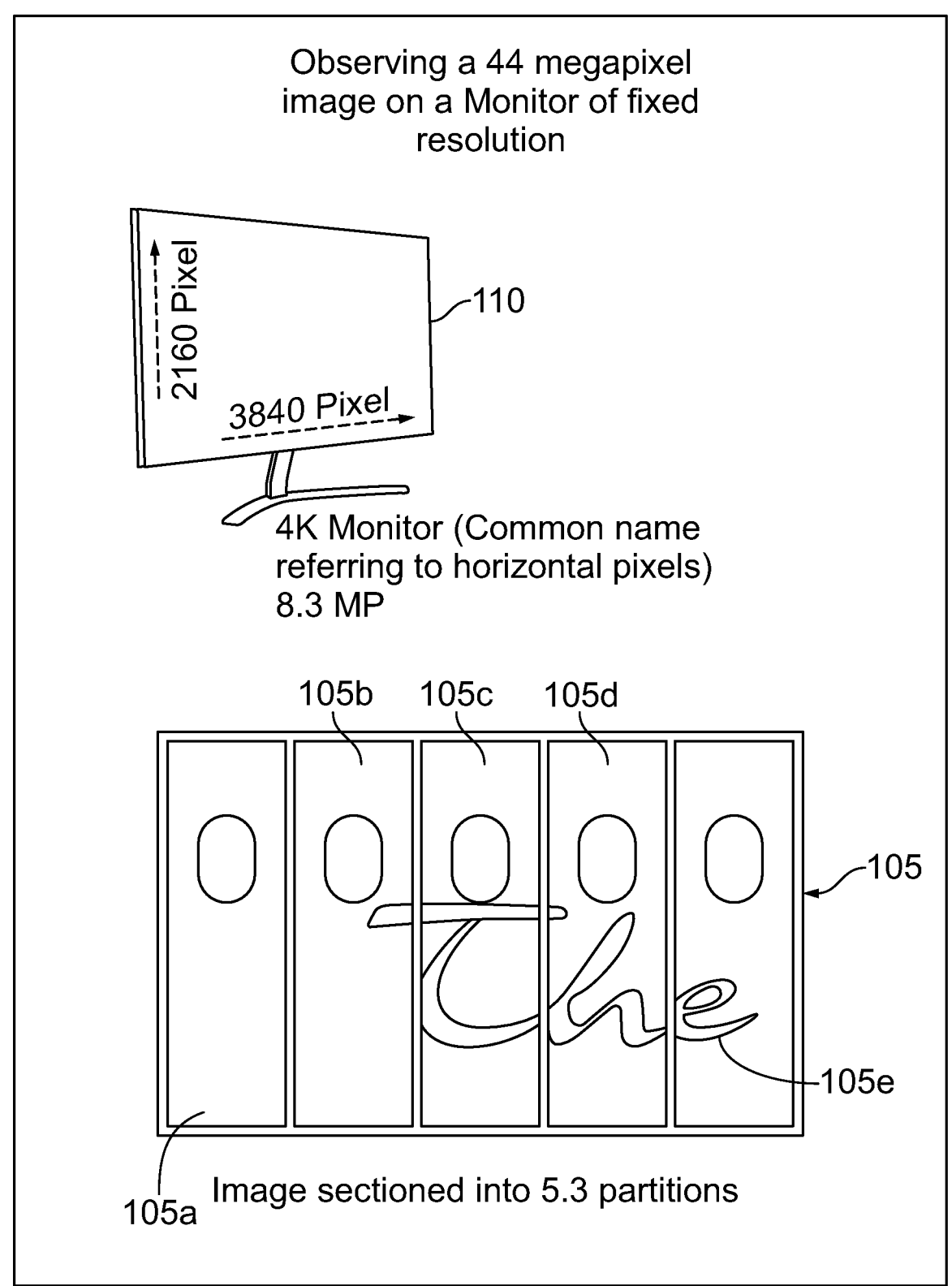
FIG. 9 illustrates a simplified description of observing a 44 megapixel image on a monitor of fixed resolution.

FIG. 9 illustrates a simplified description of observing a 44 megapixel (MP) image on a monitor of fixed resolution. As shown and described in FIG. 9, resolution of an exemplary display 110 (such as a monitor) is a measure of how many pixels the display 110 can show. Higher resolution results in sharper images. In the case of a human eye at 30.5 inches away from an object that covers a field of view of 48 inches×72 inches, the monitor resolution is to provide 44 MP. Thus, the control unit 106 can use a 1:1 representation of 44 MP to maintain the human visual experience.

As an example, to view the full 44 MP image on an 8.3 MP monitor (3840×2160 pixels), also known as 4K resolution, the control unit 106 removes 35.7 MP from the image 105 creating a lower resolution image. Viewing the image on the 8.3 MP monitor represents approximately ⅕ of the pixel data. To observe all 44 MP of the image on an 8.3 MP display 110, the control unit 106 partitions the image 105 into 5.3 MP parts 105a, 105b, 105c, 105d, and 105e on the display 110.

Optionally, a smaller monitor at a specific resolution can provide sharper images than a larger monitor at the same resolution. However, a sharper image on a smaller monitor may present difficulties in observing details due to monitor size.

Figure 10:
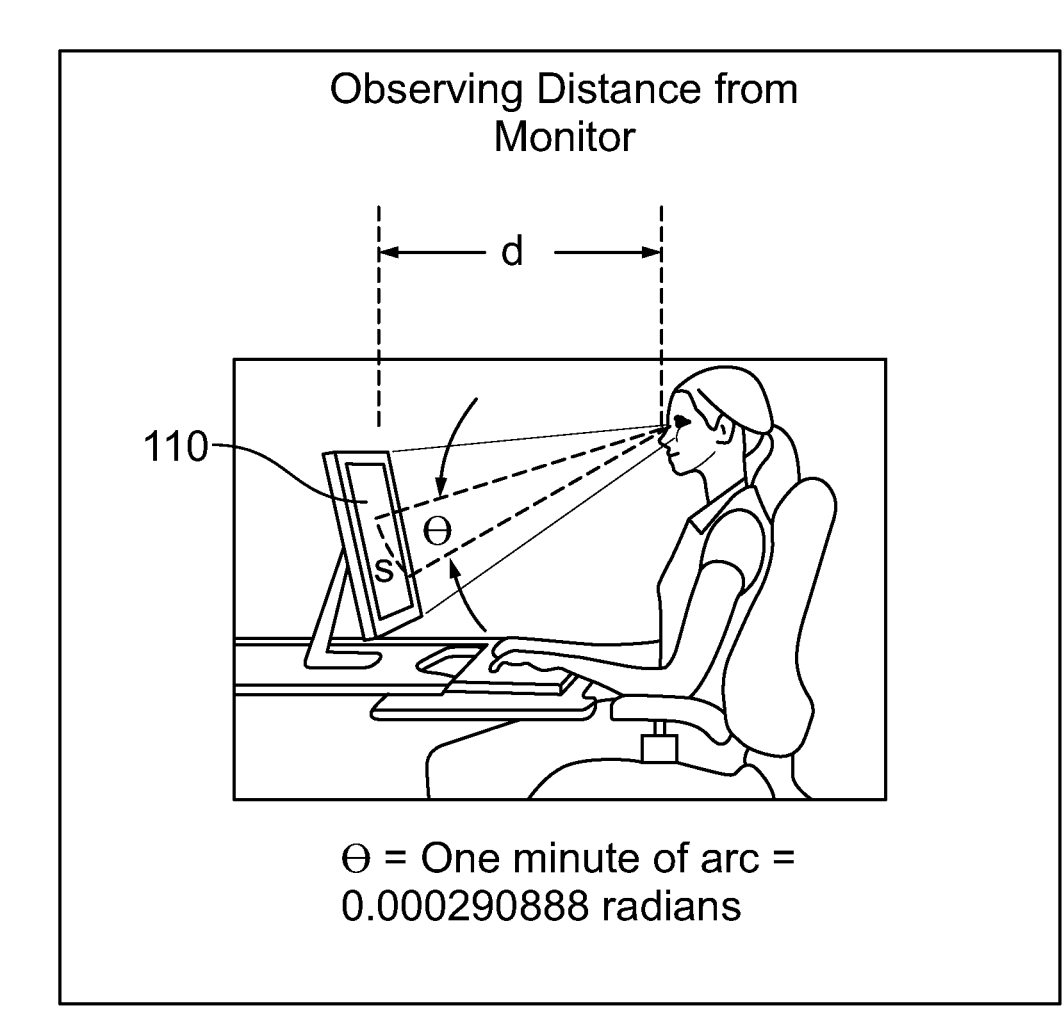
FIG. 10 illustrates a simplified description of an observing distance from a display.

FIG. 10 illustrates a simplified description of an observing distance d from a display 110. As shown and described with respect to FIG. 10, the remote inspection is conducted at a computer station (for example, the user interface 108, shown in FIG. 1) having the display 110 (such as an electronic monitor) positioned at a specified position from the observer's eye. The monitor-to-eye distance ensures one pixel of screen resolution to be seen at one minute of arc by the observer. The distance d ensures that the monitor-to-eye distance allows 1 pixel of screen resolution to be seen at 1 minute of arc by the observer. As an example, the display 110 is a 4K monitor, which is 21 inches wide (3840 pixel), 12 inches in height (2160 pixel), and 8,217,600 Pixel (8.3 MP). The monitor area=21 inches×12 inches=252 square inches. The area of one pixel is 252 sq inches/8,217,600 pixel=3.06681E-05 square inches. S=√Area of one pixel=√3.06681E-05=0.005538 inches. d=S/Θ=0.005538 inches/0.000290888 radians. d=19.03785 inches observing distance from the display 110.

Figure 11:
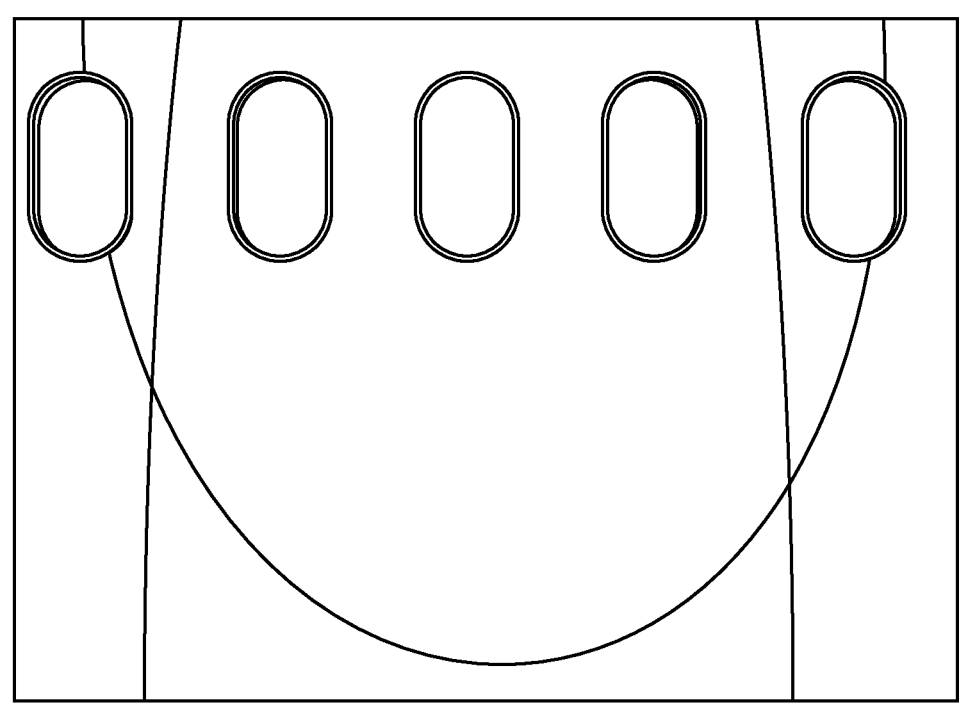
FIG. 11 illustrates an image of a portion of an aircraft, according to an example of the present disclosure.
Figure 12:
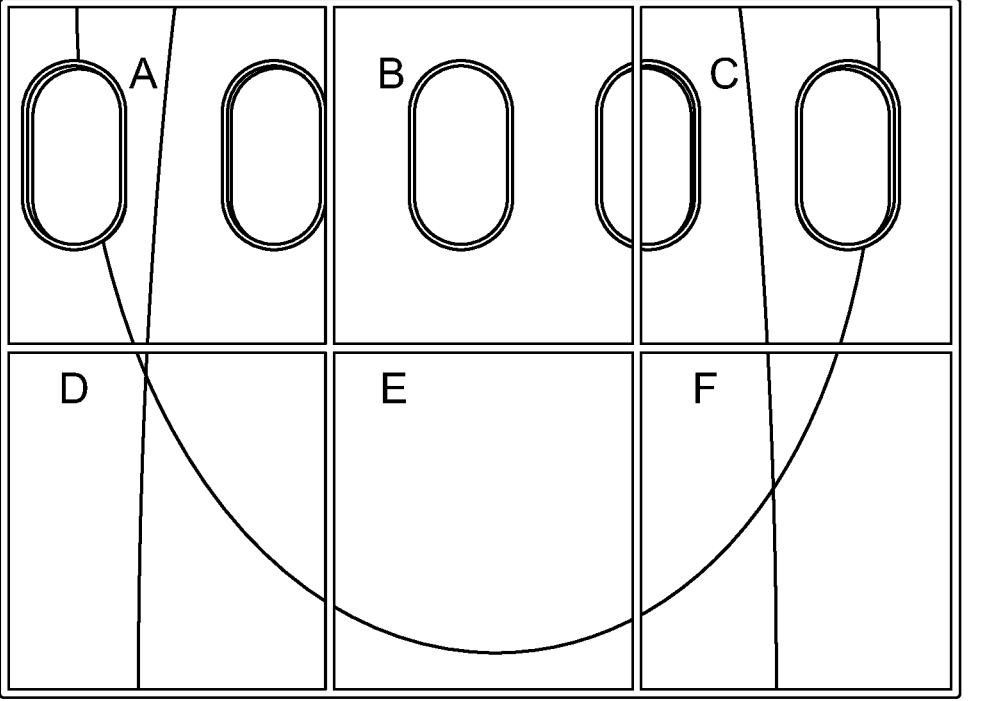
FIG. 12 illustrates the image of FIG. 11 in partitions, according to an example of the present disclosure.

FIG. 11 illustrates an image 105 of a portion of an aircraft, according to an example of the present disclosure. FIG. 12 illustrates the image 105 of FIG. 11 in partitions or parts A, B, C, D, E, and F, according to an example of the present disclosure. Referring to FIGS. 1-12, in order to present an individual an image 105 at the display 110 as it would be seen at the location of the aircraft 102, the control unit 106 partitions the image 105 for the inspection at the display 110. For example, the control unit 106 partitions the image 105 into separate parts A-F. The control unit 106 determines the size, shape, and number of parts A-F using various factors including, but not limited to, inspection monitor specifications, size/resolution of the acquired image, type of inspection to be performed, etc. As an example, based on human eye resolution, the control unit 106 divides the image 105 (acquired by the imaging device 104 at the location of the aircraft 102) of 44 MP into six 7.3 MP parts A-F, as shown in FIG. 12.

In at least one example, the images 105 are shown on the display 110, and the individual inspects the images 105 for anomalies (such as damage, defects, and the like) on the exterior of the aircraft 102. Optionally, or additionally, in at least one example, the control unit 106 compares the images 105 in relation to the reference images 109 (such as stored images of the aircraft, as manufactured, and/or from previous inspections) within the memory 107. Based on the comparison, the control unit 106 can automatically flag differences between the current images 105 and the reference images 109. As another example, the control unit 106 can automatically determine the anomalies, such as through artificial intelligence, machine learning, and/or the like. In at least one example, the control unit 106 can also tag the images with relevant images numbers to provide a unique image identifier that supports other trend analysis processes.

In at least one example, the sequence in which the parts A-F are presented on the display 110 can be predefined or determined based on artificial intelligence or machine learning. For example, parts with identified or potential defects can be shown first.

The images can be checked by the control unit 106 for color, contrast, and resolution. The control unit 106 can also determine and indicate an image overlap percentage. The images can be configured to overlap one another, which can provide different points of view and contrasts, and can provide easier identification of anomalies.

In at least one example, the control unit 106 can also register aircraft surface coordinates in relation to the images 105. As such, the control unit 106 can provide identification of where the images 105 are in relation to the aircraft 102.

In at least one example, the control unit 106 can also overlay frame and rib station, stringer, longeron, wing spar, and the like locations on the images.

In at least one example, the control unit 106 is configured to provide an inspection image coverage progression.

In at least one example, the control unit 106 is configured to identify defective areas of interest, categorize, and classify defects, evaluate defect size and depth, perform non-contact, non-destructive testing, and/or provide reports. The control unit 106 can analyze images 105 from multiple inspections using data analytics and trend analysis to identify anomalies in the images. In at least one example, defect or damage information can be translated by the control unit 106 to a three-dimensional model of the aircraft 102 that documents dent and buckle information (for example, damage type, size, location, etc.).

In at least one example, all or part of the systems and methods described herein may be or otherwise include an artificial intelligence (AI) or machine-learning system that can automatically perform operations of the methods described herein. For example, the control unit 106 can be an artificial intelligence or machine learning system. These types of systems may be trained from outside information and/or self-trained to repeatedly improve the accuracy with how data is analyzed to automatically detect anomalies within the images 105. Over time, these systems can improve by determining such information with increasing accuracy and speed, thereby significantly reducing the likelihood of any potential errors. For example, the AI or machine-learning systems can learn and determine image partition parameters, and automatically detect anomalies within the images 105, defect areas, and/or the like. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), and/or the like. The systems may be trained and re-trained using feedback from one or more prior analyses of the data, ensemble data, and/or other such data. Based on this feedback, the systems may be trained by adjusting one or more parameters, weights, rules, criteria, or the like, used in the analysis of the same. This process can be performed using the data and ensemble data instead of training data, and may be repeated many times to repeatedly improve the determination and location of various features within the images 105. The training minimizes conflicts and interference by performing an iterative training algorithm, in which the systems are retrained with an updated set of data, and based on the feedback examined prior to the most recent training of the systems. This provides a robust analysis model that can better determine locations, features, structures, and/or the like in a cost effective and efficient manner.

Figure 13:
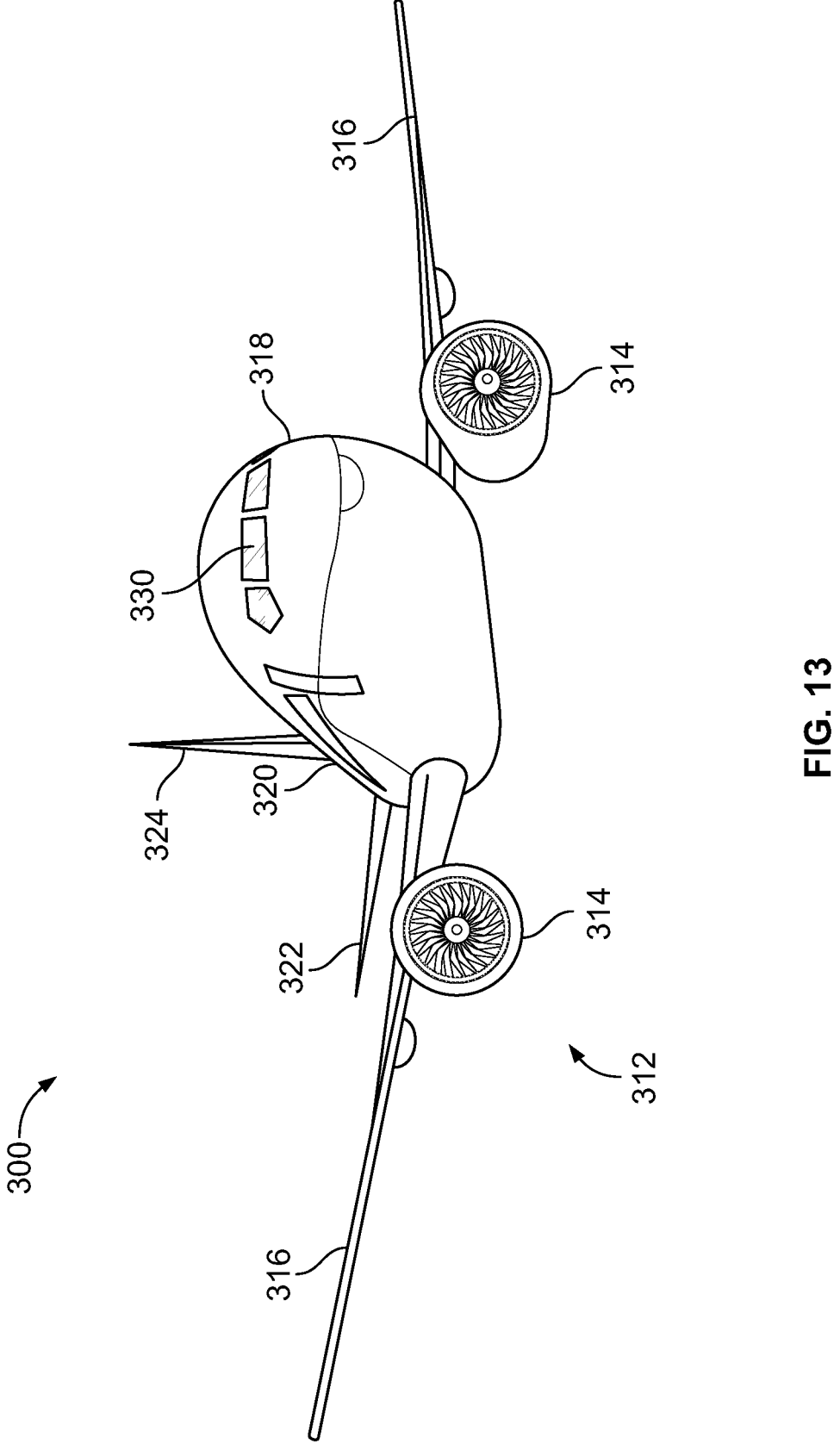
FIG. 13 illustrates a perspective front view of an aircraft, according to an example of the present disclosure.

FIG. 13 illustrates a perspective front view of an aircraft 300, according to an example of the present disclosure. The aircraft 300 is an example of the aircraft 102 shown in FIG.

1. The aircraft 300 includes a propulsion system 312 that includes engines 314, for example. Optionally, the propulsion system 312 may include more engines 314 than shown. The engines 314 are carried by wings 316 of the aircraft 300. In other examples, the engines 314 may be carried by a fuselage 318 and/or an empennage 320. The empennage 320 may also support horizontal stabilizers 322 and a vertical stabilizer 324. The fuselage 318 of the aircraft 300 defines an internal cabin 330. FIG. 13 shows an example of an aircraft 300. It is to be understood that the aircraft 300 can be sized, shaped, and configured differently than shown in FIG. 13. Optionally, examples of the present disclosure can be used with various other types of vehicles, such as automobiles, buses, trains, watercraft, spacecraft, or the like.

Figure 14:
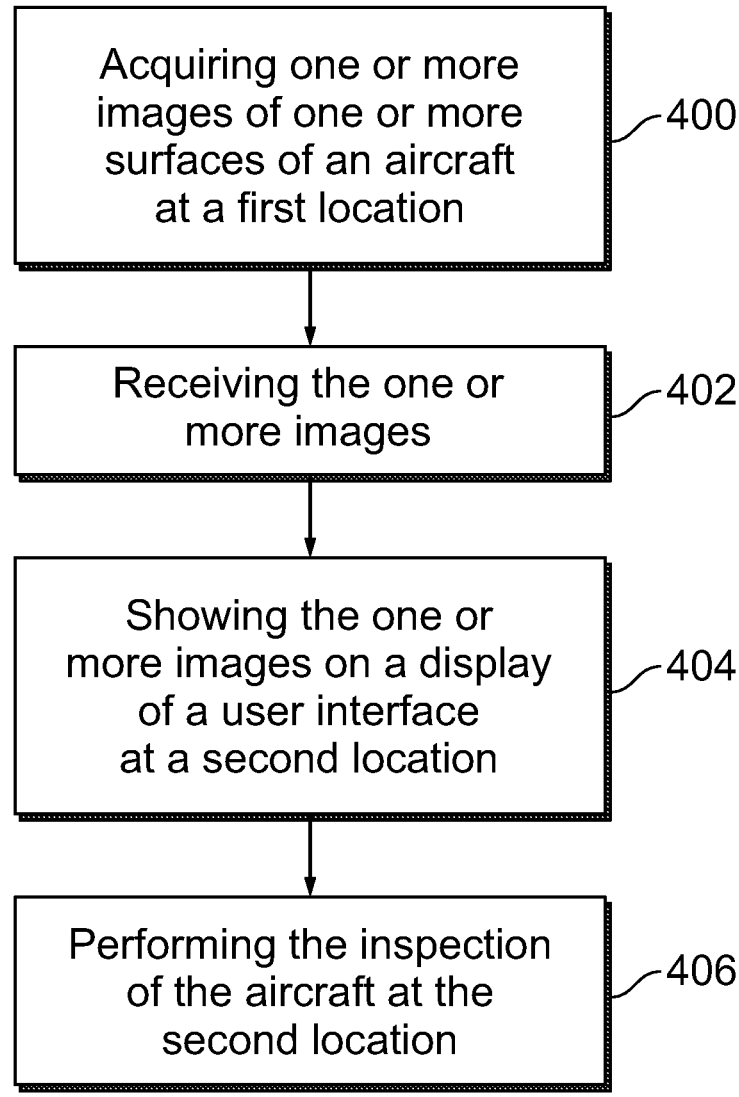
FIG. 14 illustrates a flow chart of a method, according to an example of the present disclosure.

FIG. 14 illustrates a flow chart of a method, according to an example of the present disclosure. Referring to FIGS. 1-14, the method is for an inspection of the aircraft 102, which is at the first location 112. The method includes acquiring, at 400, by the imaging device 104, one or more images 105 of one of or more surfaces of the aircraft 102 at the first location 112. The method further includes receiving, at 402, by the control unit 106 in communication with the imaging device 104, the one or more images 105. The method also includes showing, at 404, by the control unit 106, the one or more images 105 on the display 110 of the user interface 108, which is at the second location 114 that differs from the first location 112. The method also includes performing, at 406, by the showing 404, the inspection of the aircraft 102 at the second location 114. The method can also include creating and submitting a report regarding the inspection.

In at least one example, the method also includes modifying, by the control unit 106, the one or more images 105 based on at least one characteristic of the display 110.

In at least one example, the method also includes calculating, by the control unit 106, optical requirements of the display 110 to preserve an optical resolution that matches human eye inspection performance of the aircraft 102.

In at least one example, the method also includes modeling, by the control unit 106, human vision performance by applying calculations of human eye resolving power to establish a baseline for replicating capabilities on the display 110.

In at least one example, the showing 404 includes partitioning, by the control unit 106, the one or more images 105 into parts.

The method can also include storing, by the control unit 106, the one or more images 105 in the memory 107.

In at least one example, the method also includes comparing, by the control unit 106, the one or more images 105 with one or more reference images 109 of the aircraft 102, and automatically detecting, by the control unit 106, one or more anomalies through the comparing.

In at least one example, the method includes automatically determining, by the control unit 106, one or more anomalies in the one or more images 105 through artificial intelligence or machine learning.

Further, the disclosure comprises examples according to the following clauses:

Clause 1. A system configured for an inspection of an aircraft at a first location, the system comprising:

an imaging device configured to acquire one or more images of one of or more surfaces of the aircraft at the first location;

a control unit in communication with the imaging device, wherein the control unit is configured to receive the one or more images; and a user interface in communication with the control unit, wherein the user interface is at a second location that differs from the first location, wherein the user interface includes a display, wherein the control unit is configured to show the one or more images on the display, and wherein the inspection is performed at the second location.

Clause 2. The system of Clause 1, wherein the inspection comprises one or more of a general visual inspection of the aircraft, a lightning strike inspection of the aircraft, or a hail damage inspection of the aircraft.

Clause 3. The system of Clauses 1 or 2, wherein the control unit is configured to modify the one or more images based on at least one characteristic of the display.

Clause 4. The system of any of Clauses 1-3, wherein the control unit is configured to calculate optical requirements of the display to preserve an optical resolution that matches human eye inspection performance of the aircraft.

Clause 5. The system of any of Clauses 1-4, wherein the control unit is configured to model human vision performance by applying calculations of human eye resolving power to establish a baseline for replicating capabilities on the display.

Clause 6. The system of any of Clauses 1-5, wherein the control unit is configured to partition the one or more images into parts shown on the display.

Clause 7. The system of any of Clauses 1-6, wherein the control unit is further configured to store the one or more images in a memory.

Clause 8. The system of any of Clauses 1-7, further comprising a mobile cart that includes the imaging device.

Clause 9. The system of any of Clauses 1-7, further comprising a drone that includes the imaging device.

Clause 10. The system of any of Clauses 1-9, wherein the control unit is configured to compare the one or more images with one or more reference images of the aircraft to automatically detect one or more anomalies.

Clause 11. The system of any of Clauses 1-10, wherein the control unit is configured to automatically determine one or more anomalies in the one or more images through artificial intelligence or machine learning.

Clause 12. A method for an inspection of an aircraft at a first location, the method comprising:

acquiring, by an imaging device, one or more images of one of or more surfaces of the aircraft at the first location;

receiving, by a control unit in communication with the imaging device, the one or more images;

showing, by the control unit, the one or more images on a display of a user interface at a second location that differs from the first location; and performing, by said showing, the inspection of the aircraft at the second location.

Clause 13. The method of Clause 12, further comprising modifying, by the control unit, the one or more images based on at least one characteristic of the display.

Clause 14. The method of Clauses 12 or 13, further comprising calculating, by the control unit, optical requirements of the display to preserve an optical resolution that matches human eye inspection performance of the aircraft.

Clause 15. The method of any of Clauses 12-14, further comprising modeling, by the control unit, human vision performance by applying calculations of human eye resolving power to establish a baseline for replicating capabilities on the display.

Clause 16. The method of any of Clauses 12-15, wherein said showing comprises partitioning, by the control unit, the one or more images into parts.

Clause 17. The method of any of Clauses 12-16, further comprising storing, by the control unit, the one or more images in a memory.

Clause 18. The method of any of Clauses 12-17, further comprising:

comparing, by the control unit, the one or more images with one or more reference images of the aircraft; and automatically detecting, by the control unit, one or more anomalies in the one or more images through said comparing.

Clause 19. The method of any of Clauses 12-18, further comprising automatically determining, by the control unit, one or more anomalies in the one or more images through artificial intelligence or machine learning.

Clause 20. A system configured for an inspection of an aircraft at a first location, wherein the inspection comprises one or more of a general visual inspection of the aircraft, a lightning strike inspection of the aircraft, or a hail damage inspection of the aircraft, the system comprising:

an imaging device configured to acquire one or more images of one of or more surfaces of the aircraft at the first location;

a control unit in communication with the imaging device, wherein the control unit is configured to receive the one or more images; and a user interface in communication with the control unit, wherein the user interface is at a second location that differs from the first location, wherein the user interface includes a display, wherein the control unit is configured to modify the one or more images based on at least one characteristic of the display, wherein the control unit is configured to calculate optical requirements of the display to preserve an optical resolution that matches human eye inspection performance of the aircraft, wherein the control unit is configured to model human vision performance by applying calculations of human eye resolving power to establish a baseline for replicating capabilities on the display, wherein the control unit is configured to show the one or more images on the display, wherein the control unit is configured to partition the one or more images into parts shown on the display, and wherein the control unit is configured to automatically determine one or more anomalies in the one or more images through artificial intelligence or machine learning, and wherein the inspection is performed at the second location.

Clause 21. A non-transitory computer-readable storage medium comprising executable instructions that, in response to execution, cause one or more control units comprising a processor, to perform operations comprising:

receiving one or more images of one or portions of an aircraft at a first location from an imaging device; and showing the one or more images on a display of a user interface at a second location that differs from the first location to allow performance of the inspection at the second location.

As described herein, examples of the present disclosure provide improved systems and methods for inspecting aircraft.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system configured for an inspection of an aircraft at a first location, the system comprising:

an imaging device that acquires, at a first location of the aircraft, one or more images of one of or more surfaces of the aircraft at the first location;

a control unit in communication with the imaging device, wherein the control unit is configured to receive the one or more images; and a user interface in communication with the control unit, wherein the user interface is at a second location that differs from the first location, wherein the user interface includes a display, wherein the control unit is configured to model human vision performance by applying calculations of human eye resolving power to establish a baseline for replicating capabilities on the display, and wherein the control unit shows, at the second location that differs from the first location of the aircraft and the imaging device, the one or more images on the display, and wherein the inspection is performed with respect to the one or more images at the second location that differs from the first location of the aircraft and the imaging device.

2. The system of claim 1, wherein the inspection comprises one or more of a general visual inspection of the aircraft, a lightning strike inspection of the aircraft, or a hail damage inspection of the aircraft.

3. The system of claim 1, wherein the control unit is configured to modify the one or more images based on at least one characteristic of the display.

4. The system of claim 1, wherein the control unit is configured to calculate optical requirements of the display to preserve an optical resolution that matches human eye inspection performance of the aircraft.

5. The system of claim 1, wherein the control unit is configured to partition the one or more images into parts shown on the display.

6. The system of claim 1, wherein the control unit is further configured to store the one or more images in a memory.

7. The system of claim 1, further comprising a mobile cart that includes the imaging device.

8. The system of claim 1, further comprising a drone that includes the imaging device.

9. The system of claim 1, wherein the control unit compares the one or more images with one or more reference images of the aircraft to automatically detect one or more anomalies.

10. The system of claim 1, wherein the control unit automatically determines one or more anomalies in the one or more images through artificial intelligence or machine learning.

11. A method for an inspection of an aircraft at a first location, the method comprising:

acquiring, by an imaging device, one or more images of one of or more surfaces of the aircraft at the first location;

receiving, by a control unit in communication with the imaging device, the one or more images;

automatically determining, by the control unit, one or more anomalies in the one or more images through artificial intelligence or machine learning;

modeling, by the control unit, human vision performance by applying calculations of human eye resolving power to establish a baseline for replicating capabilities on a display of a user interface at a second location that differs from the first location;

showing, by the control unit, the one or more images on the display of the user interface at a second location that differs from the first location; and performing, by said showing, the inspection of the aircraft at the second location.

12. The method of claim 11, further comprising modifying, by the control unit, the one or more images based on at least one characteristic of the display.

13. The method of claim 11, further comprising calculating, by the control unit, optical requirements of the display to preserve an optical resolution that matches human eye inspection performance of the aircraft.

14. The method of claim 11, wherein said showing comprises partitioning, by the control unit, the one or more images into parts.

15. The method of claim 11, further comprising storing, by the control unit, the one or more images in a memory.

16. The method of claim 11, further comprising:

comparing, by the control unit, the one or more images with one or more reference images of the aircraft; and automatically detecting, by the control unit, one or more anomalies in the one or more images through said comparing.

17. A system configured for an inspection of an aircraft at a first location, wherein the inspection comprises one or more of a general visual inspection of the aircraft, a lightning strike inspection of the aircraft, or a hail damage inspection of the aircraft, the system comprising:

an imaging device that acquires, at the first location of the aircraft, one or more images of one of or more surfaces of the aircraft at the first location;

a control unit in communication with the imaging device, wherein the control unit is configured to receive the one or more images; and a user interface in communication with the control unit, wherein the user interface is at a second location that differs from the first location, wherein the user interface includes a display, wherein the control unit:

modifies the one or more images based on at least one characteristic of the display, calculates optical requirements of the display to preserve an optical resolution that matches human eye inspection performance of the aircraft, models human vision performance by applying calculations of human eye resolving power to establish a baseline for replicating capabilities on the display, shows, at the second location that differs from the first location of the aircraft and the imaging device, the one or more images on the display, partitions the one or more images into parts shown on the display, automatically determines one or more anomalies in the one or more images through artificial intelligence or machine learning, and wherein the inspection is performed with respect to the one or more images at the second location that differs from the first location of the aircraft and the imaging device.

18. The system of claim 1, wherein the first location is not viewable from the second location.

19. The method of claim 11, wherein said acquiring occurs at the first location of the aircraft and the imaging device, wherein said showing occurs at the second location that differs from the first location of the aircraft and the imaging device, and wherein said performing occurs with respect to the one or more images at the second location that differs from the first location of the aircraft and the imaging device.

20. The system of claim 1, wherein the control unit is further configured to determine the human eye resolving power to cover a field of view of 6'×4' by dividing a resultant object size by the field of view to provide a number of pixels that fit in a space of the field of view.

21. The method of claim 11, wherein said modeling comprises determining the human eye resolving power to cover a field of view of 6'×4' by dividing a resultant object size by the field of view to provide a number of pixels that fit in a space of the field of view.

* * * * *